United States Patent
Saiwai et al.

(10) Patent No.: US 10,362,524 B2
(45) Date of Patent: Jul. 23, 2019

(54) NETWORK APPARATUS AND USER TERMINAL

(71) Applicant: KYOCERA CORPORATION, Kyoto (JP)

(72) Inventors: Takahiro Saiwai, Kawasaki (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 283 days.

(21) Appl. No.: 14/901,875

(22) PCT Filed: Jul. 2, 2014

(86) PCT No.: PCT/JP2014/067652
§ 371 (c)(1),
(2) Date: Dec. 29, 2015

(87) PCT Pub. No.: WO2015/002232
PCT Pub. Date: Jan. 8, 2015

(65) Prior Publication Data
US 2016/0374129 A1 Dec. 22, 2016

(30) Foreign Application Priority Data
Jul. 4, 2013 (JP) .................................. 2013-140643

(51) Int. Cl.
*H04W 40/04* (2009.01)
*H04W 48/06* (2009.01)
(Continued)

(52) U.S. Cl.
CPC ........... *H04W 40/04* (2013.01); *H04L 47/125* (2013.01); *H04W 4/80* (2018.02); *H04W 8/24* (2013.01);
(Continued)

(58) Field of Classification Search
CPC .................................................. H04W 76/023
(Continued)

(56) References Cited

U.S. PATENT DOCUMENTS

| 2009/0204700 A1* | 8/2009 | Satya Sudhakar | .... H04L 67/104 709/224 |
| 2010/0009675 A1* | 1/2010 | Wijting | ............... H04W 76/023 455/426.1 |

(Continued)

FOREIGN PATENT DOCUMENTS

| JP | 2012-109681 A | 6/2012 |
| JP | 2012-524448 A | 10/2012 |

OTHER PUBLICATIONS

3GPP TR 22.803, V12.1.0 (Mar. 2013), 3rd Generation Partnership Project; Technical Specification Group Services and System Aspects; Feasibility study for Proximity Services (Prose), (Release 12), pp. 1-45.
(Continued)

*Primary Examiner* — Chuck Huynh
(74) *Attorney, Agent, or Firm* — Studebaker & Brackett PC

(57) ABSTRACT eNB 200 controls wireless connections established by UE 100-1 with other communication apparatuses. The eNB 200 performs control such that number of the wireless connections established by the UE 100-1 is equal to or less than a connection allowance number indicating an upper limit number of the wireless connections allowed to the UE 100-1.

10 Claims, 11 Drawing Sheets

(51) Int. Cl.
*H04W 8/24* (2009.01)
*H04L 12/803* (2013.01)
*H04W 4/80* (2018.01)
*H04W 76/15* (2018.01)
*H04W 84/04* (2009.01)
*H04W 76/18* (2018.01)
*H04W 76/14* (2018.01)

(52) U.S. Cl.
CPC ........... *H04W 48/06* (2013.01); *H04W 76/15* (2018.02); *H04W 76/14* (2018.02); *H04W 76/18* (2018.02); *H04W 84/042* (2013.01)

(58) Field of Classification Search
USPC ...................................... 455/422.1
See application file for complete search history.

(56) References Cited

U.S. PATENT DOCUMENTS

| | | |
|---|---|---|
| 2012/0051350 A1 | 3/2012 | Kim et al. |
| 2013/0144946 A1* | 6/2013 | Subramanian .......... H04L 63/10 709/204 |
| 2014/0122607 A1* | 5/2014 | Fodor ..................... H04W 4/70 709/204 |
| 2015/0215767 A1* | 7/2015 | Siomina ................. H04W 8/02 455/435.2 |

OTHER PUBLICATIONS

International Search Report and Written Opinion of PCT/JP2014/067652 dated Sep. 22, 2014.

* cited by examiner

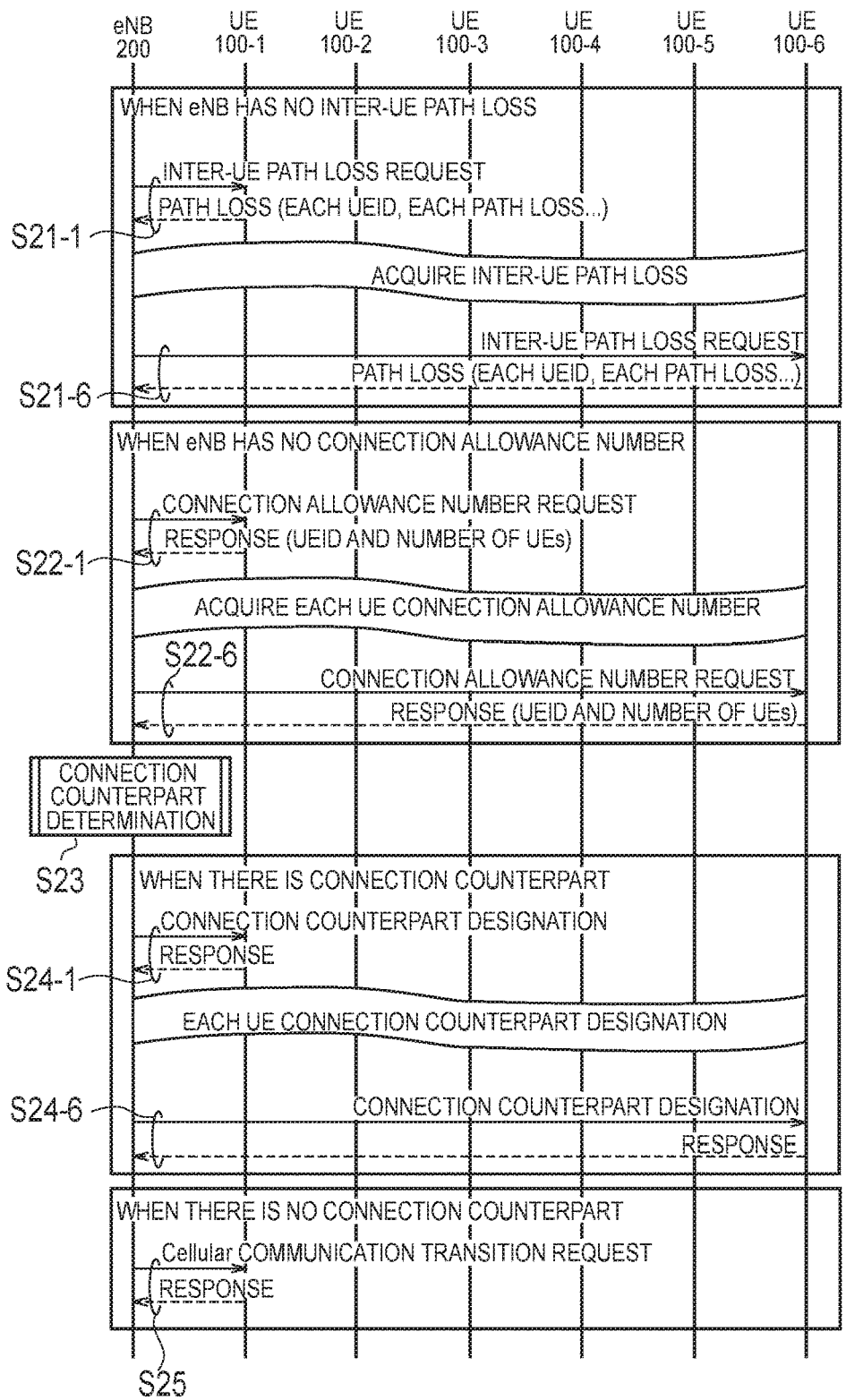

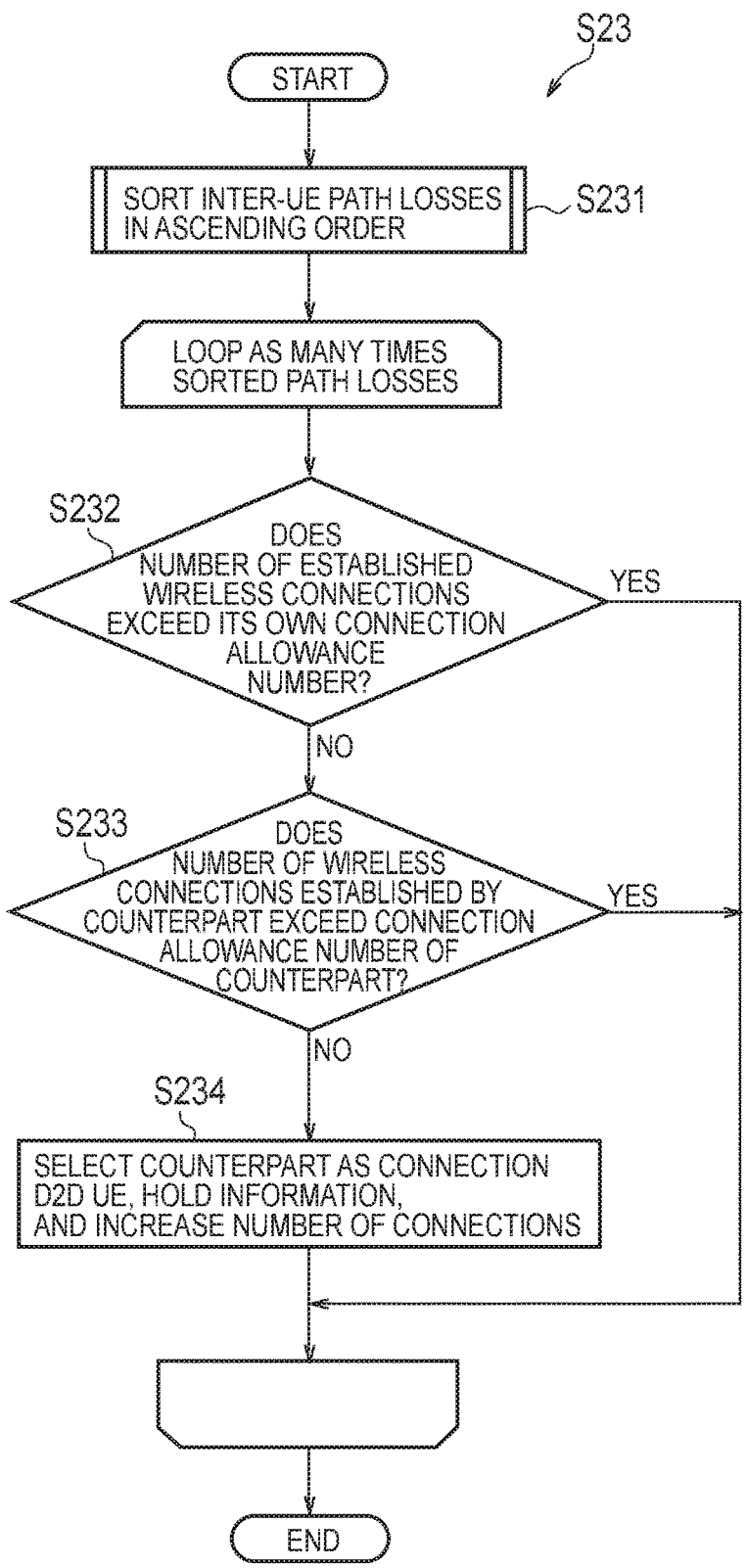

NETWORK APPARATUS AND USER TERMINAL

TECHNICAL FIELD

The present invention relates to a network apparatus and a user terminal used in a mobile communication system that supports device to device (D2D) communication.

BACKGROUND ART

In the 3rd Generation Partnership Project (3GPP) that is a mobile communication system standardization project, introduction of a device-to-device (D2D) communication into Release 12 as a new function is under consideration (see Non Patent Literature 1).

In the D2D communication, a plurality of nearby user terminals perform direct inter-terminal communication without intervention of a network. Meanwhile, in cellular communication that is ordinary communication of a mobile communication system, user terminals perform communication via a network.

CITATION LIST

Non Patent Literature

Non Patent Literature 1: 3GPP Technical Report "TR 22.803 V12.1.0," March, 2013

SUMMARY OF INVENTION

By the way, in the D2D communication, the number of other user terminals that establish a wireless connection with a user terminal is not limited to one and considered to be two or more.

However, when one user terminal establishes a plurality of wireless connections, if the number of wireless connections is too large, since it exceeds the processing capability of the user terminal or control of the D2D communication is complicated, it is unlikely to perform satisfactory D2D communication.

In this regard, it is an object of the present invention to provide a network apparatus and a user terminal, which are capable of guaranteeing satisfactory D2D communication even when one user terminal establishes a plurality of wireless connections.

A network apparatus according to a first aspect is included in a network of a mobile communication system. The network apparatus includes a controller configured to control wireless connections established by a user terminal with other communication apparatuses, the user terminal supporting device-to-device (D2D) communication that is direct inter-terminal communication that does not pass through the network. The controller performs control such that number of the wireless connections established by the user terminal is equal to or less than a connection allowance number indicating an upper limit number of the wireless connections allowed to the user terminal.

A user terminal according to a second aspect supports device-to-device (D2D) communication that is direct inter-terminal communication which does not pass through a network of a mobile communication system. The user terminal includes a transmitter configured to transmit, to a network apparatus included in the network, information on a connection allowance number indicating an upper limit number of wireless connections allowed to the user terminal. Number of wireless connections established between the user terminal and other communication apparatuses is controlled to be equal to or less than the connection allowance number by the network apparatus.

BRIEF DESCRIPTION OF DRAWINGS

FIG. 12 is a sequence diagram illustrating an operation according to the second embodiment.

FIG. 13 is a flowchart illustrating an operation according to the second embodiment.

DESCRIPTION OF EMBODIMENTS

Overview of Embodiment

Figure 1:
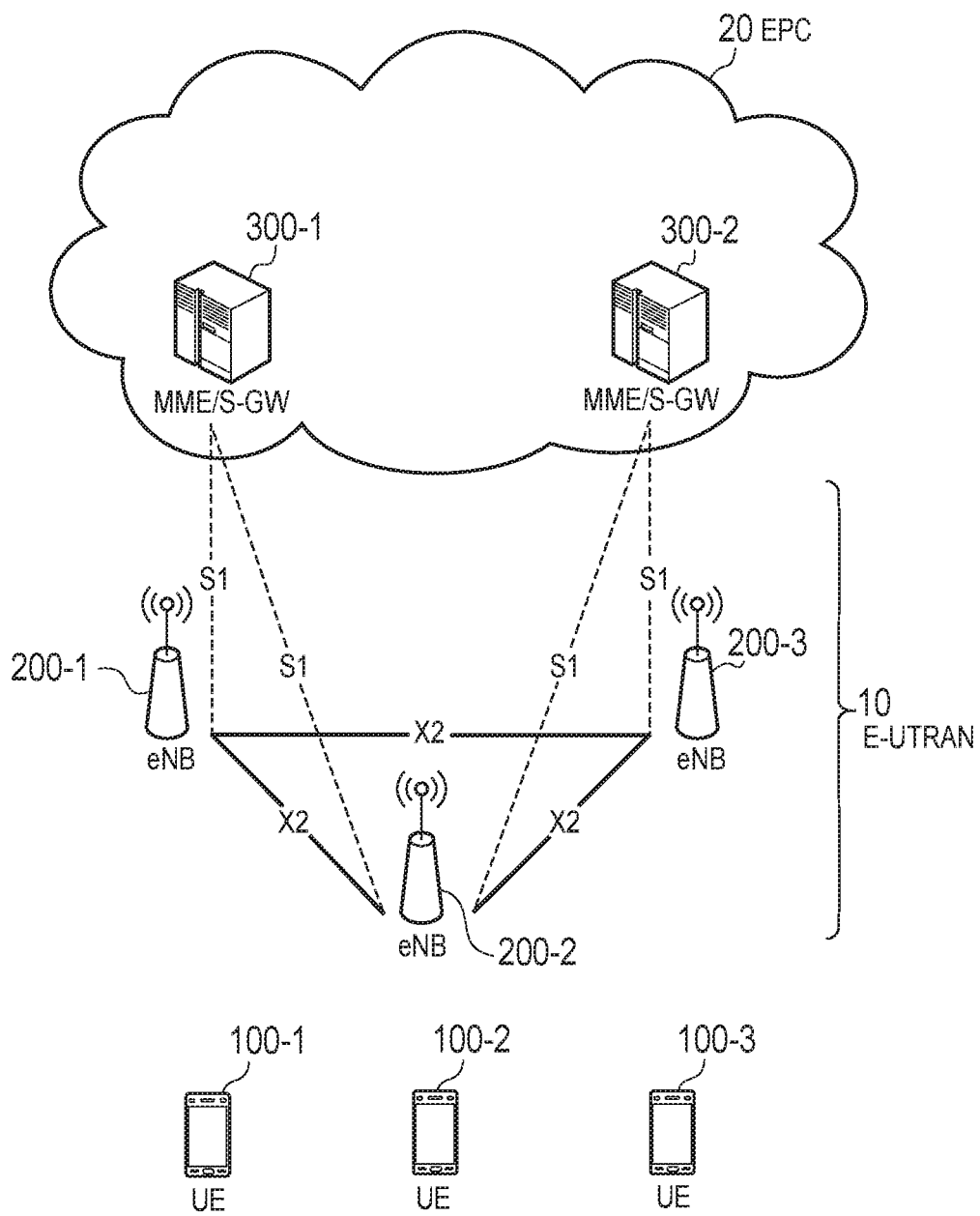
FIG. 1 is a configuration diagram illustrating an LTE system according to first and second embodiments.

A network apparatus according to first and second embodiments is included in a network of a mobile communication system. The network apparatus includes a controller configured to control wireless connections established by a user terminal with other communication apparatuses, the user terminal supporting device-to-device (D2D) communication that is direct inter-terminal communication that does not pass through the network. The controller performs control such that number of the wireless connections established by the user terminal is equal to or less than a connection allowance number indicating an upper limit number of the wireless connections allowed to the user terminal.

In the first embodiment, the network apparatus receives, from the user terminal, capability information on a capability of the user terminal. The controller performs control such that the number of the wireless connections established by the user terminal is equal to or less than the connection allowance number that is set based on the capability information.

In the first embodiment, the network apparatus receives, from the user terminal, communication environment information on to a communication environment of the user terminal. The controller performs control such that the number of the wireless connections established by the user terminal is equal to or less than the connection allowance number that is set based on the communication environment information.

In the first embodiment, the network apparatus acquires load information on a load of a cell in which the user terminal is located. The controller performs control such that the number of the wireless connections established by the user terminal is equal to or less than the connection allowance number that is set based on the load information.

In the first embodiment, the network apparatus receives the connection allowance number from the user terminal. The controller performs control such that the number of the wireless connections established by the user terminal is equal to or less than the connection allowance number received from the user terminal.

In the first embodiment, the network apparatus manages a first cell in which the user terminal is located. When a handover of the user terminal is performed from the first cell to other cell, the controller gives a notification indicating the connection allowance number to the other cell.

In the second embodiment, the controller selects a D2D connection destination terminal serving as another user terminal that is to establish wireless connection with the user terminal while performing control such that the number of the wireless connections established by the user terminal is equal to or less than the connection allowance number.

In the second embodiment, the controller selects the D2D connection destination terminal from among other user terminals based on information indicating a distance or a path loss between the user terminal and the other user terminals.

In the second embodiment, the controller selects the D2D connection destination terminal from among other user terminals based on information indicating an amount of data that is scheduled to be transmitted by the other user terminals.

In the second embodiment, the controller selects the D2D connection destination terminal from among other user terminals based on information indicating whether or not the other user terminals are outside a coverage of cellular communication.

In the second embodiment, the controller selects the D2D connection destination terminal from among other user terminals based on connection allowance numbers that is set to the other user terminals.

A user terminal according to the first and second embodiments supports device-to-device (D2D) communication that is direct inter-terminal communication which does not pass through a network of a mobile communication system. The user terminal includes a transmitter configured to transmit, to a network apparatus included in the network, information on a connection allowance number indicating an upper limit number of wireless connections allowed to the user terminal. Number of wireless connections established between the user terminal and other communication apparatuses is controlled to be equal to or less than the connection allowance number by the network apparatus.

In the first embodiment, the information on the connection allowance number is capability information on a capability of the user terminal.

In the first embodiment, the information on the connection allowance number is communication environment information on a communication environment of the user terminal.

In the first embodiment, the information on the connection allowance number is the connection allowance number that is preset to the user terminal or the connection allowance number that is set by the user terminal.

First Embodiment

Hereinafter, embodiments in which the present invention is applied to an LTE system will be described.

(System Configuration)

FIG. 1 is a configuration diagram of an LTE system according to a first embodiment. The LTE system according to the first embodiment includes user equipment (UE) 100, an evolved-UMTS terrestrial radio access network (E-UTRAN) 10, an evolved packet core (EPC) 20.

The UE 100 corresponds to a user terminal. The UE 100 is a mobile communication apparatus, and performs wireless communication with a cell (a serving cell) of a connection destination. A configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected with one another via an X2 interface. A configuration of the eNB 200 will be described later.

The eNB 200 manages one or more cells. The eNB 200 performs wireless communication with the UE 100 that has established a connection its own cell. The eNB 200 has a radio resource management (RRM) function, a user data routing function, a measurement control function for mobility control/scheduling, and the like. A "cell" is used as a term indicating a minimum unit of a wireless communication area. The "cell" is also used as a term indicating a function of performing wireless communication with the UE 100.

The EPC 20 corresponds to a core network. The EPC 20 includes a mobility management entity/serving-gateway (MME/S-GW) 300. The MME performs various kinds of mobility control on the UE 100. The S-GW performs user data transfer control. The MME/S-GW 300 is connected with the eNB 200 via an S1 interface.

Figure 2:
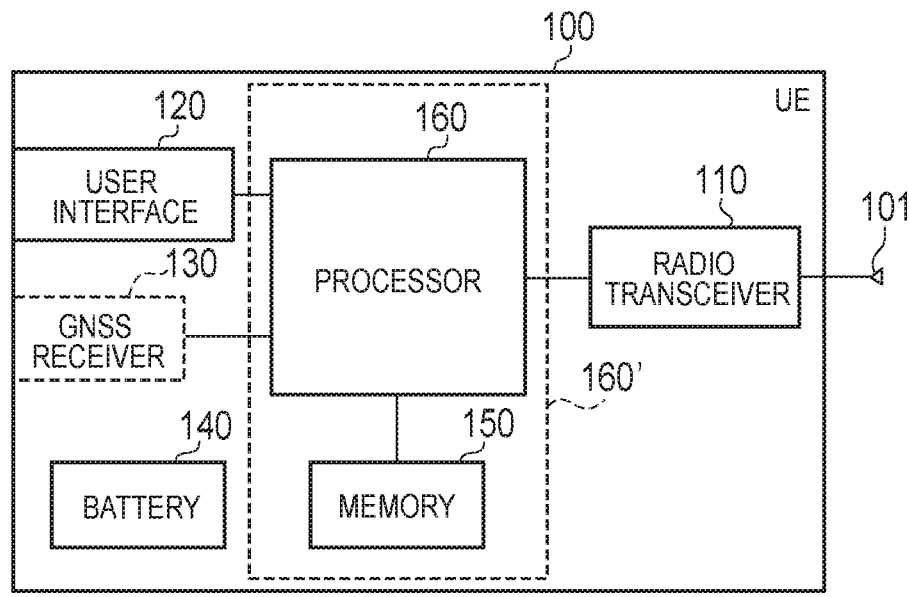
FIG. 2 is a block diagram illustrating a UE according to the first and second embodiments.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
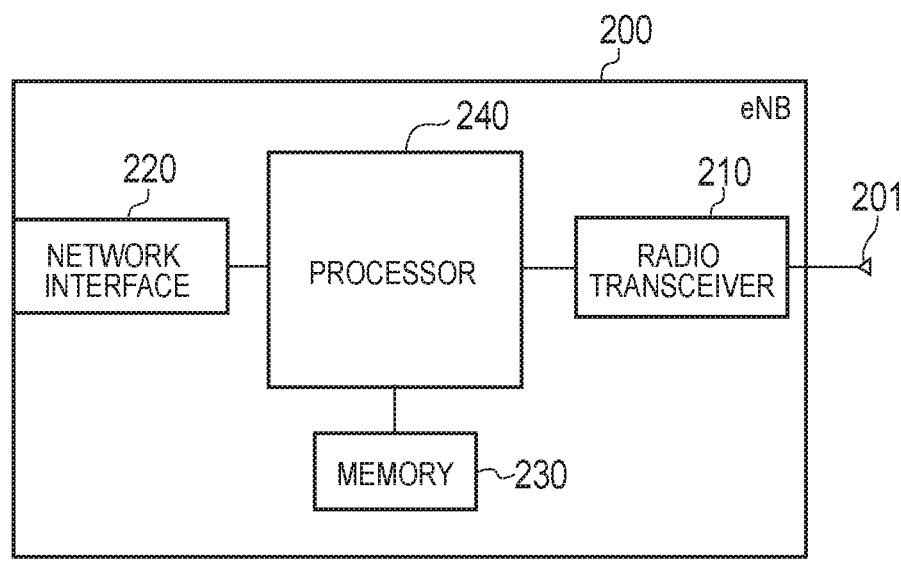
FIG. 3 is a block diagram illustrating an eNB according to the first and second embodiments.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a controller.

The antenna 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
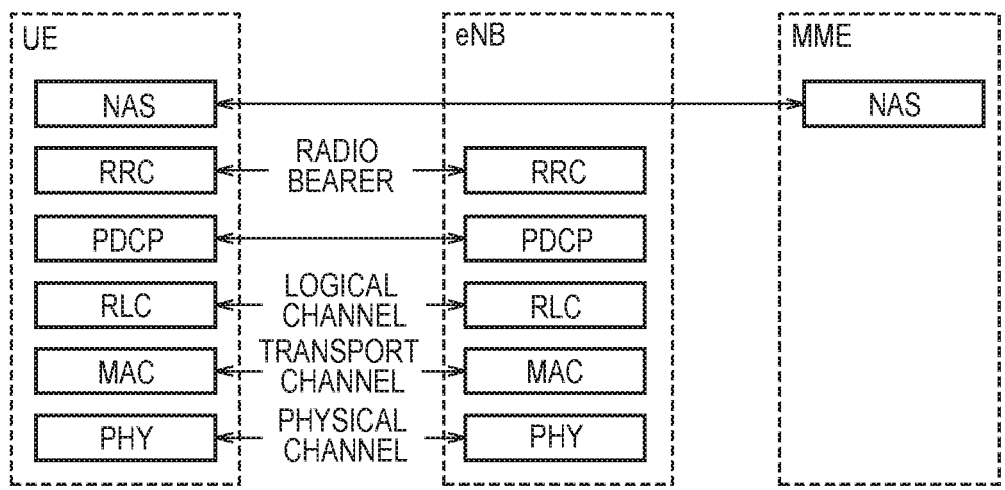
FIG. 4 is a protocol stack diagram illustrating a wireless interface according to the first and second embodiments.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, a retransmission process by hybrid ARQ (HARQ), and the like. Between the MAC layer of the UE 100 and the MAC layer of the eNB 200, data is transmitted via a transport channel. The MAC layer of the eNB 200 includes a scheduler for determining transport format of an uplink and a downlink (a transport block size and a modulation and coding scheme) and resource blocks to be assigned to UE 100.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane for dealing with control signals. Between the RRC layer of the UE 100 and the RRC layer of the eNB 200, control signals (RRC messages) for various types of configuration is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in (a connected state) an RRC connected state, otherwise the UE 100 is in an idle state (an RRC idle state).

A NAS (Non-Access Stratum) layer positioned above the RRC layer performs a session management, a mobility management and the like.

Figure 5:
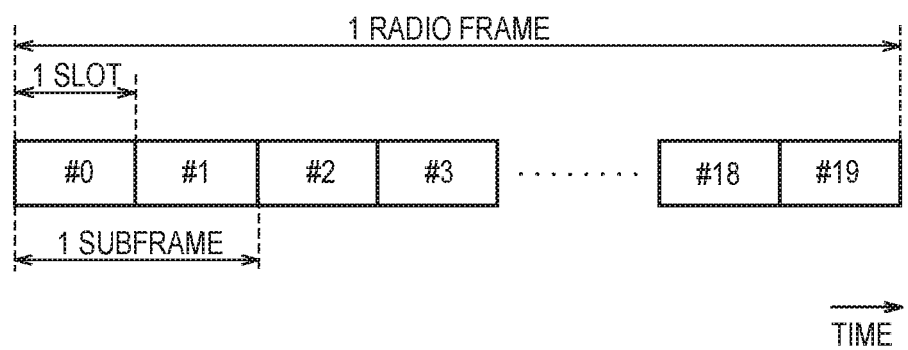
FIG. 5 is a configuration diagram illustrating a radio frame according to the first and second embodiments.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. One subcarrier and one symbol constitutes one resource element.

Among radio resources assigned to the UE 100, a frequency resource can be specified by a resource block and a time resource can be specified by a subframe (or slot).

In DL, an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data.

In UL, both ends in the frequency direction of each subframe are control regions used as a physical uplink control channel (PUCCH) for mainly transmitting a control signal. Other portions of each subframe is a region available as a physical uplink shared channel (PUSCH) for mainly transmitting user data.

(D2D Communication)

The LTE system according to the first embodiment supports the D2D communication that is direct inter-terminal communication (inter-UE communication). Here, the description will proceed with a comparison between the D2D communication and cellular communication that is ordinary communication of the LTE system. The cellular communication is a communication mode in which a data path passes through a network (the E-UTRAN 10 and the EPC 20). The data path refers to a communication path of user data. Meanwhile, the D2D communication is a communication mode in which a data path set between the UEs does not pass through a network.

Figure 6:
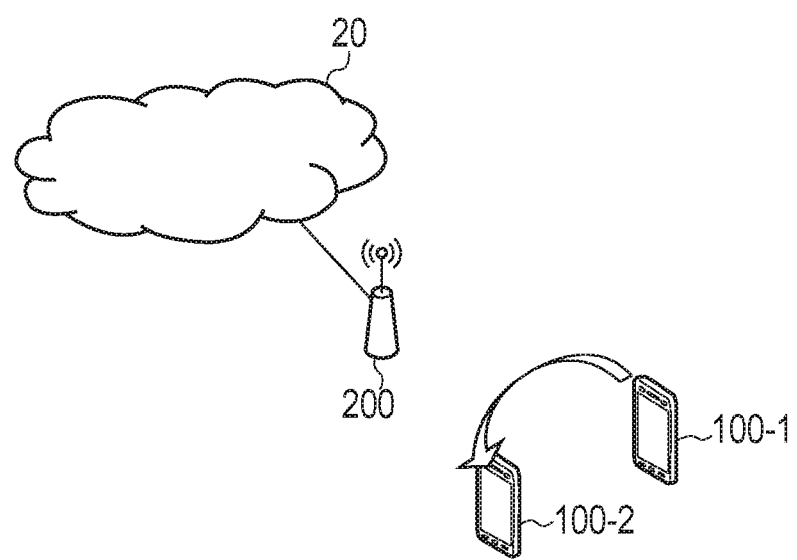
FIG. 6 is a diagram illustrating D2D communication according to the first and second embodiments.

FIG. 6 is a diagram illustrating the D2D communication. In the D2D communication, the data path does not pass through the eNB 200 as illustrated in FIG. 6. The UE 100-1 and the UE 100-2 that are close to each other directly perform wireless communication at low transmission power in the cell of the eNB 200. As described above, as the UE 100-1 and the UE 100-2 that are close to each other directly perform wireless communication at low transmission power, it is possible to reduce the power consumption of the UE 100 to be smaller than in the cellular communication and reduce interference to a neighboring cell.

Operation According to First Embodiment

Next, an operation according to the first embodiment will be described.

(1) Overview of Operation

Figure 7:
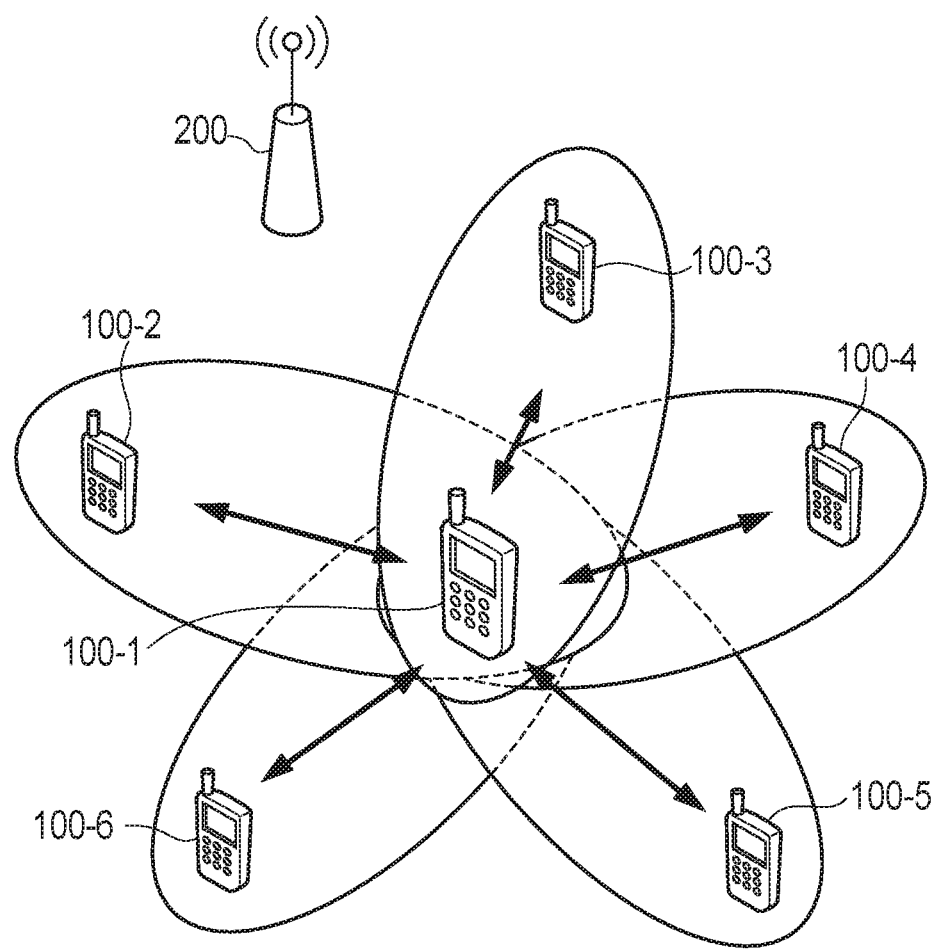
FIG. 7 is a diagram illustrating an operating environment according to the first and second embodiments.

FIG. 7 is a diagram illustrating an operating environment according to the first embodiment. In FIG. 7, the eNB 200 corresponds to a network apparatus included in the network of the mobile communication system (the LTE system).

A plurality of UEs 100 (the UEs 100-1 to 100-6) exist in a cell managed by the eNB 200 as illustrated in FIG. 7. Here, "exist" does not depend on whether the UE 100 is in an idle state (an RRC idle state) or a connected state (an RRC connected state), but in the first embodiment, each of the UEs 100 is considered to be in the connected state.

Each of the UEs 100-1 to 100-6 is a UE (D2D UE) that supports the D2D communication. In the D2D communication, the number of other UEs 100 that establish a wireless connection with one UE 100 is not limited to one and considered to be two or more. In the example of FIG. 7, each of the UEs 100-2 to 100-6 located at positions adjacent to the UE 100-1 transmits a D2D communication connection request to the UE 100-1.

However, when one UE 100-1 establishes a plurality of wireless connections, if the number of wireless connections is too large, since the processing capability of the UE 100-1 is exceeded or control of the D2D communication is complicated, it is unlikely to perform satisfactory D2D communication.

In the first embodiment, the eNB 200 controls wireless connection which the UE 100 establishes with other communication apparatuses. Here, "other communication apparatuses" refer to the UE 100 (the UEs 100-2 to 100-6) other than the UE 100-1 of the control target. Alternatively, the eNB 200 may be included in "other communication apparatuses."

The eNB 200 performs control such that the number of wireless connections established by the UE 100-1 is equal to or less than a connection allowance number serving as an upper limit number of wireless connections allowed to the UE 100-1. As a result, even when one UE 100-1 establishes a plurality of wireless connections, it is possible to prevent the processing capability of the UE 100-1 from being exceeded and prevent control of the D2D communication from being complicated, and thus it is possible to perform satisfactory D2D communication. In the first embodiment, the connection allowance number indicates an upper limit number (hereinafter, referred to a "D2D connection allowance number") of wireless connections (D2D connections) which the UE 100-1 establishes with the other UEs 100. Alternatively, the connection allowance number may include an upper limit number (hereinafter, referred to as a "cell connection allowance number") of wireless connections (RRC connections) which the UE 100-1 establishes the cell of the eNB 200.

Further, the eNB 200 performs control such that the number of wireless connections established by the UE 100-2 is equal to or less than the connection allowance number serving as the upper limit number of wireless connections allowed to the UE 100-2. The same applies to the UEs 100-3 to 100-6.

A method of setting the connection allowance number includes methods described below. Here, an example in which the connection allowance number is set to the UE 100-1 will be described.

In a first setting method, the eNB 200 receives capability information related to capabilities of the UE 100-1 from the UE 100-1. The eNB 200 performs control such that the number of wireless connections established by the UE 100-1 is equal to or less than the connection allowance number set based on the capability information. For example, the eNB 200 performs a setting such that as the capabilities of the UE 100-1 increases, the connection allowance number set to the UE 100-1 increases. As a result, the connection allowance number suitable for the capabilities of the UE 100-1 can be set to the UE 100-1. Examples of the capabilities of the UE 100-1 include the number of buffers arranged in the UE 100-1 and the number of entities that can be generated by the UE 100-1. The number of buffers refers to the number of buffers that are secured by the UE 100-1 for each connection destination. The number of entities refers to the number of entities that are generated by the UE 100-1 for each connection destination. For example, when the UE 100-1 performs D2D connection, the UE 100-1 individually manages an RRC, an RLC, a MAC, and the like for each UE to be connected, and targets that are individually managed are "entities."

In a second setting method the eNB 200 receives communication environment information related to a communication environment of the UE 100-1 from the UE 100-1. The eNB 200 performs control such that the number of wireless connections established by the UE 100-1 is equal to or less than the connection allowance number set based on the communication environment information. Here, the "communication environment" mainly indicates a communication environment related to the D2D communication. For example, the eNB 200 performs a setting such that as the communication environment of the UE 100-1 gets better, the connection allowance number set to the UE 100-1 increases. As a result, the connection allowance number suitable for the communication environment of the UE 100-1 can be set to the UE 100-1. Examples of the communication environment include a path loss (an inter-UE path loss) between the UE 100-1 and another UE 100 and channel characteristics (an inter-UE channel) between the UE 100-1 and another UE 100.

In a third setting method, the eNB 200 acquires load information related to a load of a cell (that is, its own cell) in which the UE 100-1 is located. The eNB 200 performs controls such that the number of wireless connections established by the UE 100-1 is equal to or less than the connection allowance number set based on the load information. For example, the eNB 200 performs a setting such that as the load of its own cell increases, the connection allowance number set to the UE 100-1 increases. As a result, it is possible to distribute the load of its own cell, particularly, the load by the cellular communication to the D2D communication. Alternatively, when the eNB 200 performs scheduling of the D2D communication, a setting may be performed such that as the load of its own cell increases, the connection allowance number set to the UE 100-1 decreases. As a result, it is possible to the load of the cell associated with the scheduling of the D2D communication. Examples of the load of the cell include the number of UEs 100 that establish the wireless connection (RRC connection) with the cell and a use rate of radio resources in the cell.

In the first to third setting methods, when the UE 100 establishes a connection with its own cell, the eNB 200 may set the connection allowance number to the UE 100. Alternatively, the eNB 200 may set the connection allowance number to the UE 100 according to a request made from the UE 100. However, in the second and third setting methods, since the communication environment of the UE 100 and the load of the cell vary from hour to hour, it is desirable to update the connection allowance number at regular intervals.

In a fourth setting method, the connection allowance number in the UE 100-1 is set to the UE 100-1 in advance. Alternatively, the connection allowance number in the UE 100-1 is determined by the UE 100-1. When the connection allowance number in the UE 100-1 is determined by the UE 100-1, the same methods as the first to third setting methods can be used. The eNB 200 receives the connection allowance number from the UE 100-1. The eNB 200 performs control such that the number of wireless connections established by the UE 100-1 is equal to or less than the connection allowance number received from the UE 100-1.

In the fourth setting method, when the UE 100 establishes a connection with the cell of the eNB 200, the UE 100 may transmit its own connection allowance number to the eNB 200. Alternatively, the UE 100 may transmit its own connection allowance number to the eNB 200 according to a request made from the eNB 200. Alternatively, the UE 100 may transmit its own connection allowance number to the eNB 200 at regular intervals.

(2) First Operation Pattern

Figure 8:
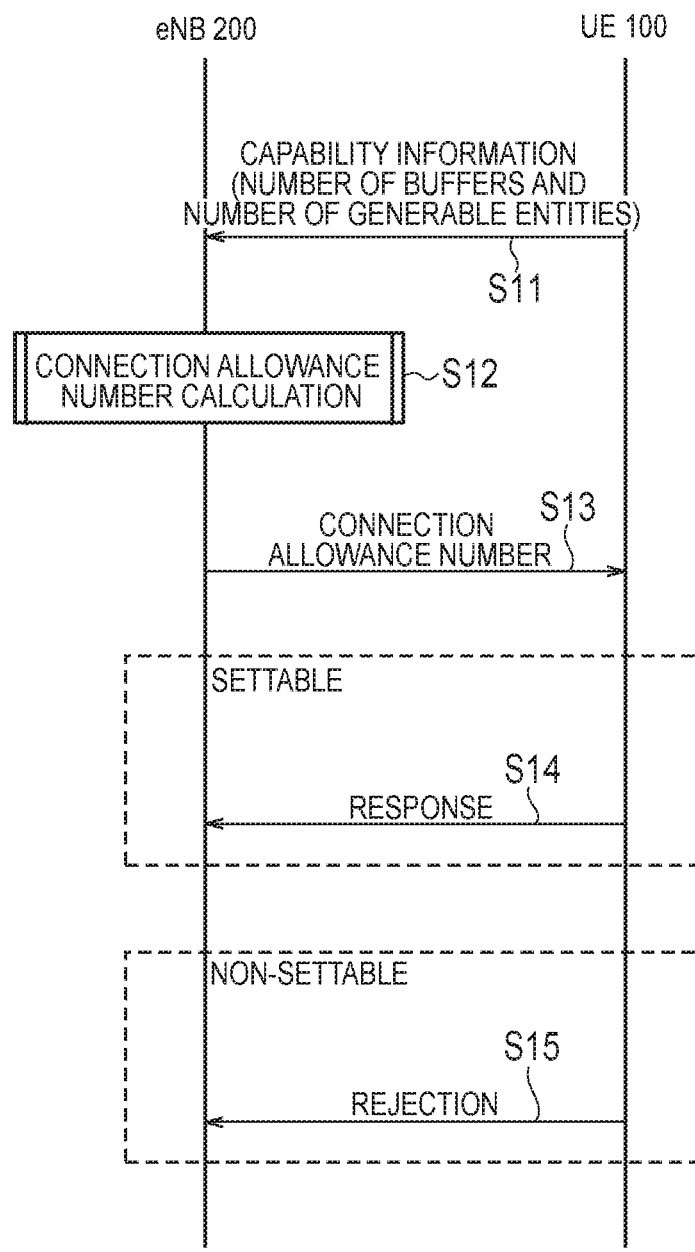
FIG. 8 is a sequence diagram illustrating a first operation pattern according to the first embodiment.

FIG. 8 is a sequence diagram illustrating a first operation pattern according to the first embodiment. The first operation pattern corresponds to the first setting method and the second setting method. Here, the description will proceed using the first setting method as an example.

As illustrated in FIG. 8, in step S11, the UE 100 transmits the capability information related its capabilities to the eNB 200. The capability information includes the number of buffers arranged in the UE 100 and the number of entities that can be generated by the UE 100. The capability information may include information indicating whether or not the UE 100 supports the D2D communication.

In step S12, the eNB 200 that has received the capability information calculates the connection allowance number to be set to the UE 100 based on the received capability information. A flow of calculating the connection allowance number will be described later.

In step S13, the eNB 200 transmits the calculated connection allowance number to the UE 100. The UE 100 that has received the connection allowance number determines whether or not the connection allowance number is accepted. When the connection allowance number is accepted, in step S14, the UE 100 transmits a response indicating that the connection allowance number is accepted to the eNB 200. In contrast, when the connection allowance number is not accepted, in step S15, the UE 100 transmits a response indicating that the connection allowance number is rejected to the eNB 200.

Figure 9:
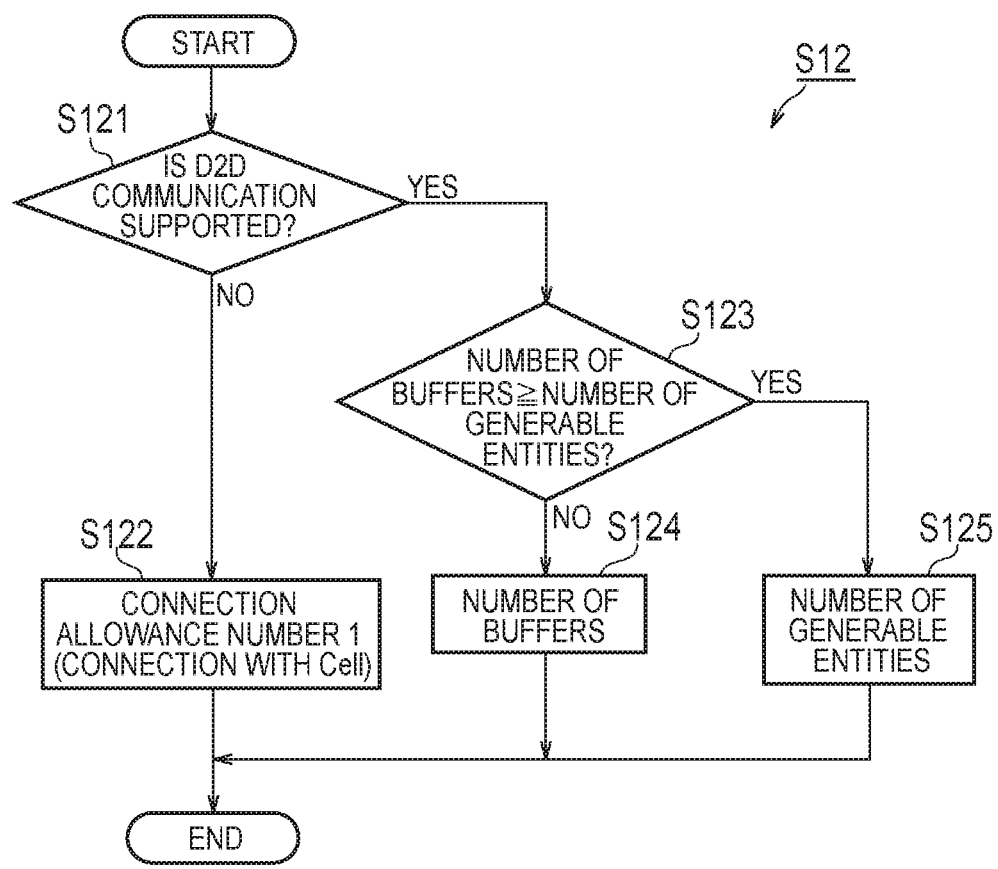
FIG. 9 is a flowchart illustrating the first operation pattern according to the first embodiment.

FIG. 9 is a flowchart illustrating the first operation pattern according to the first embodiment. The present flow illustrates the details of step S12 of FIG. 8.

As illustrated in FIG. 9, in step S121, the eNB 200 determines whether or not the UE 100 supports the D2D communication based on the capability information received from the UE 100. When the UE 100 does not support the D2D communication (NO in step S121), in step S122, the eNB 200 sets the connection allowance number of the UE 100 to "1."

When the UE 100 supports the D2D communication (YES in step S121), in step S123, the eNB 200 determines whether or not the "number of buffers" included in the capability information is equal to or more than the "number of entities." When the "number of buffers" included in the capability information is the "number of entities" (NO in step S123), in step S124, the eNB 200 sets a value of the "number of buffers" as the connection allowance number of the UE 100. In contrast, when the "number of buffers" included in the capability information is equal to or more than the "number of entities" (YES in step S123), in step S125, the eNB 200 sets a value of the "number of entities" as the connection allowance number of the UE 100.

(3) Second Operation Pattern

Figure 10:
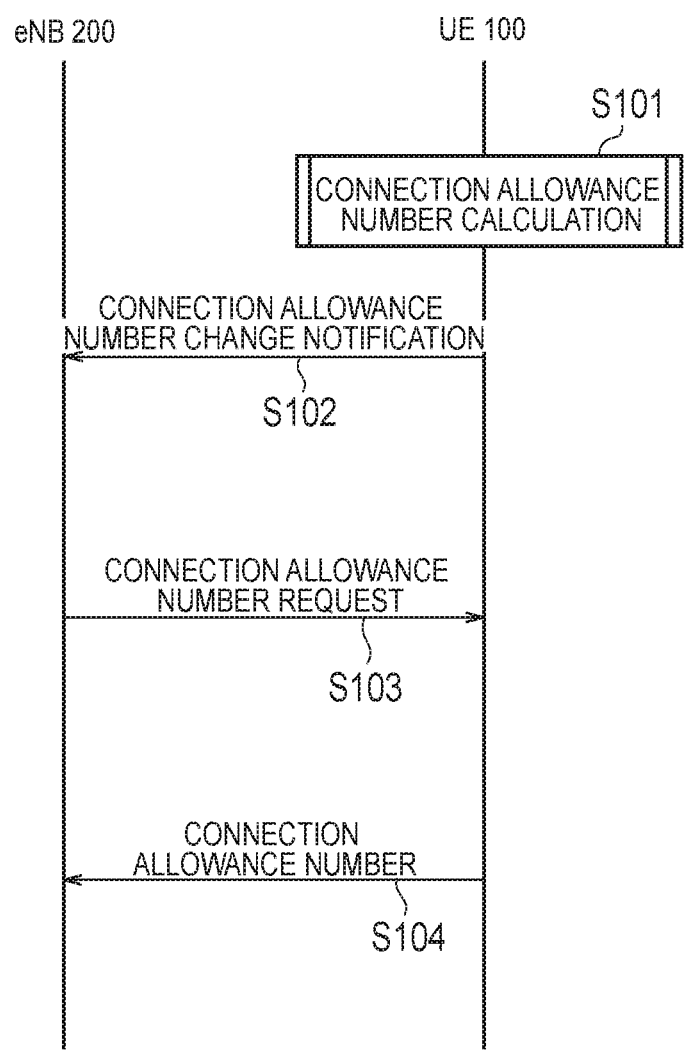
FIG. 10 is a sequence diagram illustrating a second operation pattern according to the first embodiment.

FIG. 10 is a sequence diagram illustrating a second operation pattern according to the first embodiment. The second operation pattern corresponds to the fourth setting method.

In step S101, the UE 100 calculates its own connection allowance number. The same flow as in FIG. 9 can be applied as a flow of calculating the connection allowance number.

In step S102, when the UE 100 changes its own connection allowance number, the UE 100 transmits a connection allowance number change notification indicating that the connection allowance number is changed to the eNB 200. The eNB 200 that has received the connection allowance number change notification determines whether or not the connection allowance number of the UE 100 is acquired. Here, the description will proceed with an assumption that the eNB 200 determines that the connection allowance number of the UE 100 is acquired.

In step S103, the eNB 200 transmits a connection allowance number notification request to the UE 100. In step S104, the UE 100 that has received the connection allowance number notification request transmits a notification including its own connection allowance number to the eNB 200. The connection allowance number to be notified may be a value obtained by adding the D2D connection allowance number and the cell connection allowance number or may be a set of the D2D connection allowance number and the cell connection allowance number.

The notification of the connection allowance number from the UE 100 to the eNB 200 may be a notification by an RRC message or may be a notification by a MAC message. In the case of the notification by the RRC message, for example, the connection allowance number may be included in a "UE-EUTRA-capability information element" related to the capabilities of the UE 100. In this case, the set of the D2D connection allowance number and the cell connection allowance number may be included in the "UE-EUTRA-capability information element."

Figure 11:
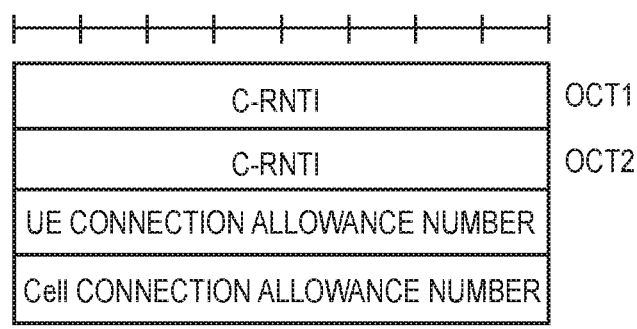
FIG. 11 is a diagram illustrating a notification by an MAC message according to the first embodiment.

FIG. 11 is a diagram illustrating the notification by the MAC message. As illustrated in FIG. 11, MAC message includes a cell-radio network temporary identifier (C-RNTI) allocated to the UE 100 and the connection allowance number (the D2D connection allowance number and the cell connection allowance number). In FIG. 11, the connection allowance number has a fixed length but may have a variable length.

(4) Handover

When the UE 100 performs a handover to a neighboring cell, it is desirable to take the connection allowance number of the UE 100 over to the neighboring cell.

In the first embodiment, when the UE 100 performs a handover from its own cell to the neighboring cell, the eNB 200 gives a notification indicating the connection allowance number to the eNB 200 (a neighboring eNB) that manages the neighboring cell. When a handover request is transmitted to the neighboring eNB through an X2 interface, the eNB 200 may include the connection allowance number of the UE 100 in the handover request as a part of a UE context.

Conclusion of First Embodiment

As described above, the eNB 200 sets the connection allowance number using any one of the first to fourth setting methods. Further, the eNB 200 performs control such that the number of wireless connections established by the UE 100 is equal to or less than the connection allowance number serving as the upper limit number of wireless connections allowed to the UE 100. Thus, even when one UE 100 establishes a plurality of wireless connections, it is possible to prevent the processing capability of the UE 100 from being exceeded and prevent control of the D2D communication from being complicated, and thus it is possible to perform satisfactory D2D communication.

Second Embodiment

Next, a second embodiment will be described focusing on different points from the first embodiment. In the second embodiment, a system configuration and an operating environment are similar to those in the first embodiment.

Operation According to Second Embodiment

An operation according to the second embodiment will be described below.

(1) Overview of Operation

In the second embodiment, the eNB 200 selects a D2D connection destination terminal serving as another UE 100 that is to establish a wireless connection with the UE 100 while performing control such that the number of wireless connections established by the UE 100 is equal to or less than the connection allowance number. As the eNB 200 selects the D2D connection destination terminal as described above, it is possible to select the D2D connection destination terminal more appropriately than when the UE 100 selects the D2D connection destination terminal.

A method of selecting the D2D connection destination terminal includes methods described below. Here, the description will proceed with an example in which the D2D connection destination terminal of the UE 100-1 (see FIG. 7) is selected.

In a first selection method, the eNB 200 selects the D2D connection destination terminal from among the other UEs 100 based on information indicating distances or path losses between the UE 100-1 and the other UEs 100. As a result, it is possible to preferentially select another UE 100 that is small in the distance or the path loss with the UE 100-1 as the D2D connection destination terminal, and thus it is possible to provide the satisfactory D2D communication. Differences of GNSS position information of the UE 100-1 and the other UEs 100 may be used as information indicating distances between the UE 100-1 and the other UEs 100.

In a second selection method, the eNB 200 selects the D2D connection destination terminal of the UE 100-1 from among the other UEs 100 based on information indicating an amount of data that is scheduled to be transmitted by the other UEs 100. As a result, it is possible to preferentially select another UE 100 that is large in an amount of data that is scheduled to be transmitted to the UE 100-1 as the D2D connection destination terminal, and thus the D2D communication can effectively be used. Examples of the information indicating an amount of data that is scheduled to be transmitted by the other UEs 100 include information indicating an amount of data accumulated in the buffers of the other UEs 100 and information indicating an application executed by the other UEs 100.

In a third selection method, the eNB 200 selects the D2D connection destination terminal of the UE 100-1 from among the other UEs 100 based on information indicating whether or not the other UEs 100 are outside the coverage of the cellular communication. As a result, it is possible to preferentially select another UE 100 that is outside the coverage of the cellular communication as the D2D connection destination terminal, and thus the D2D communication can effectively be used. That is, when the D2D connection destination terminal is selected in view of the connection allowance number, the UE 100 that is outside the coverage is preferentially selected. Further, in order to specify the UE 100 that is outside the coverage through the eNB 200, a method of acquiring information of a UE that is outside the coverage using a UE that is within the coverage may be used. Specifically, a UE that is within the coverage receives a discovery signal transmitted from a UE that is outside the coverage, and the UE that is within the coverage reports information related to the UE that is outside the coverage to the eNB 200. Here, preferably, the UE that is outside the coverage includes information indicating that it is outside the coverage in the discovery signal and transmit the resulting discovery signal.

In a fourth selection method, the eNB 200 selects the D2D connection destination terminal of the UE 100-1 from among the other UEs 100 based on the connection allowance numbers set to the other UEs 100. As a result, it is possible to cause the number of wireless connections of each UE 100 to fall within the connection allowance number.

(2) Operation Sequence and Operation Flow

FIG. 12 is a sequence diagram illustrating an operation according to the second embodiment. Here, an example of using the first selection method and the fourth selection method together in the operating environment illustrated in FIG. 7 will be described.

As illustrated in FIG. 12, in step S21, the eNB 200 requests the UEs 100-1 to 100-6 to transmit the inter-UE path loss, and acquires the inter-UE path losses. For example, the UEs 100-1 to 100-6 transmit a reference signal of known transmission power, and thus a difference between reception power and transmission power when the reference signal is received can be used as the inter-UE path loss.

In step S22, the eNB 200 requests the UEs 100-1 to 100-6 to transmit the connection allowance number, and acquires the connection allowance numbers.

In step S23, the eNB 200 selects the D2D connection destination terminal of each of the UEs 100-1 to 100-6. An operation of selecting the D2D connection destination terminal will be described in detail later.

In step S24, the eNB 200 designates the D2D connection destination terminal for each of the UEs 100-1 to 100-6. The eNB 200 may cause the UE 100 for which it is difficult to select the D2D connection destination terminal to transition to the cellular communication (step S25).

FIG. 13 is a flowchart illustrating an operation according to the second embodiment. The present flow illustrates the details of step S23 of FIG. 12. Here, the description will proceed with an example the D2D connection destination terminal of the UE 100-1 is selected.

As illustrated in FIG. 13, in step S231, the eNB 200 sorts the inter-UE path losses acquired for the UE 100-1 in ascending order.

A process of steps S232 to S234 is repeated as many times as the sorted inter-UE path losses.

In step S232, the eNB 200 determines whether or not the number of wireless connections established by the UE 100-1 exceeds the connection allowance number of the UE 100-1.

When a determination result in step S232 is "NO," in step S233, the eNB 200 determines whether or not the number of wireless connections established by another UE 100 corresponding to the inter-UE path loss serving as the target exceeds the connection allowance numbers of another UE 100.

When a determination result in step S233 is "NO," in step S234, the eNB 200 selects the other UE 100 as the D2D connection destination terminal of the UE 100-1, and holds the information.

After the process of steps S232 to S234 is repeated as many times as the inter-UE path losses, the eNB 200 designates another UE 100 and the UE 100-1 stored as the D2D connection destination terminal as mutual D2D connection destination terminals.

Conclusion of Second Embodiment

As described above, the eNB 200 selects the D2D connection destination terminal serving as another UE 100 that is to establish a wireless connection with the UE 100 while performing control such that the number of wireless connections established by the UE 100 is equal to or less than the connection allowance number. As the eNB 200 selects the D2D connection destination terminal as described above, it is possible to select the D2D connection destination terminal more appropriately than when the UE 100 selects the D2D connection destination terminal.

Other Embodiments

In the above embodiments, the eNB 200 has been described as a specific example of the network apparatus according to the present invention, but the network apparatus according to the present invention is not limited to the eNB 200 and may be a higher-level device (the MME 300, the OAM, or the like) of the eNB 200.

In the above embodiments, the LTE system has been described as an example of the cellular communication system, but the cellular communication system is not limited to the LTE system, and the present invention may be applied to a system other than the LTE system.

This application claims the benefit of Japanese Patent Application No. 2013-140643 (filed on Jul. 4, 2013), the entire contents of which are incorporated herein by reference.

INDUSTRIAL APPLICABILITY

The present invention is useful in mobile communication fields.

The invention claimed is:

1. A network apparatus included in a network of a mobile communication system, comprising:
   a controller configured to control wireless connections established by a user terminal with other communication apparatuses, the user terminal supporting device-to-device (D2D) communication that is direct inter-terminal communication that does not pass through the network,
   a receiver configured to receive, from the user terminal, communication environment information on to a communication environment of the user terminal, and capability information on a processing capability of the user terminal, wherein
   the controller is configured to:
      set a connection allowance number on a basis of the communication environment information, and the capability information, wherein the connection allowance number indicates an upper limit number of the wireless connections allowed to the user terminal, and the connection allowance number increases as the processing capability of the user terminal increases; and
      perform control such that number of the wireless connections established by the user terminal is equal to or less than the connection allowance number, and
   the capability information includes a number of buffers arranged in the user terminal and a number of entities that can be generated by the user terminal.

2. The network apparatus according to claim 1, wherein the network apparatus acquires load information on a load of a cell in which the user terminal is located, and
   the controller is configured to perform control such that the number of the wireless connections established by the user terminal is equal to or less than the connection allowance number that is set based on the load information.

3. The network apparatus according to claim 1, wherein the network apparatus manages a first cell in which the user terminal is located, and
   when a handover of the user terminal is performed from the first cell to another cell, the controller is configured to give a notification indicating the connection allowance number to the another cell.

4. The network apparatus according to claim 1, wherein the controller is configured to select a D2D connection destination terminal serving as another user terminal that is to establish wireless connection with the user terminal while performing control such that the number of the wireless connections established by the user terminal is equal to or less than the connection allowance number.

5. The network apparatus according to claim 4, wherein the controller is configured to select the D2D connection destination terminal from among other user terminals based on information indicating a distance or a path loss between the user terminal and the other user terminals.

6. The network apparatus according to claim 5, wherein the controller is configured to select the D2D connection destination terminal from among other user terminals based on connection allowance numbers that is set to the other user terminals.

7. The network apparatus according to claim 4, wherein the controller is configured to select the D2D connection destination terminal from among other user terminals based on information indicating an amount of data that is scheduled to be transmitted by the other user terminals.

8. The network apparatus according to claim 4, wherein the controller is configured to select the D2D connection destination terminal from among other user terminals based on information indicating whether or not the other user terminals are outside a coverage of cellular communication.

9. A user terminal that supports device-to-device (D2D) communication that is direct inter-terminal communication which does not pass through a network of a mobile communication system, comprising:

a transmitter configured to transmit, to a network apparatus included in the network, communication environment information on a communication environment of the user terminal, and capability information on a processing capability of the user terminal, as information for setting a connection allowance number indicating an upper limit number of wireless connections allowed to the user terminal, wherein number of wireless connections established between the user terminal and other communication apparatuses is controlled to be equal to or less than the connection allowance number set, by the network apparatus, based on the communication environment information and the capability information, and the connection allowance number increases as the processing capability of the user terminal increases, and the capability information includes a number of buffers arranged in the user terminal and a number of entities that can be generated by the user terminal.

10. A network apparatus included in a network of a mobile communication system, comprising:

a controller configured to control wireless connections established by a user terminal with other communication apparatuses, the user terminal supporting device-to-device (D2D) communication that is direct inter-terminal communication that does not pass through the network, a receiver configured to receive, from the user terminal, communication environment information on to a communication environment of the user terminal, wherein the controller is configured to:

set a connection allowance number on a basis of the communication environment information, wherein the connection allowance number indicates an upper limit number of the wireless connections allowed to the user terminal;

perform control such that number of the wireless connections established by the user terminal is equal to or less than the connection allowance number;

select, among a plurality of user terminals, a D2D connection destination terminal that is to establish the D2D communication with the user terminal, based on the communication environment information, while performing control such that the number of the wireless connections established by the user terminal is equal to or less than the connection allowance number; and select the D2D connection destination terminal from among the plurality of user terminals based on information indicating whether or not the plurality of user terminals is outside a coverage of cellular communication.

\* \* \* \* \*